United States Patent
Aanestad

(12) 
(10) Patent No.: US 6,632,516 B2
(45) Date of Patent: *Oct. 14, 2003

(54) LOW EMISSIVITY, HIGH REFLECTIVITY INSULATION

(75) Inventor: Rangvald Aanestad, Enchant (CA)

(73) Assignee: Krona Industries Ltd., Enchant (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/881,720

(22) Filed: Jun. 18, 2001

(65) Prior Publication Data

US 2001/0031368 A1 Oct. 18, 2001

Related U.S. Application Data

(63) Continuation of application No. 09/262,060, filed on Mar. 4, 1999, now Pat. No. 6,248,433, which is a continuation of application No. PCT/CA97/00625, filed on Sep. 3, 1997.

(51) Int. Cl.$^7$ .............................................. B32B 15/08
(52) U.S. Cl. ................... 428/304.4; 428/480; 428/458; 428/500
(58) Field of Search ................. 428/458, 480, 428/500, 314.4, 304.4

(56) References Cited

U.S. PATENT DOCUMENTS

| | | |
|---|---|---|
| 3,640,832 A | 2/1972 | Kurz |
| 4,042,746 A | 8/1977 | Hofer |
| 4,281,802 A | 8/1981 | Burley |
| 4,705,717 A | 11/1987 | Cain et al. |

| | | | |
|---|---|---|---|
| 6,248,433 B1 | * | 6/2001 | Aanestad .................. 428/304.4 |

FOREIGN PATENT DOCUMENTS

| | | |
|---|---|---|
| CA | 2067683 | 3/1994 |
| FR | 2 650 532 | 2/1991 |
| WO | WO-96/20827 | 7/1996 |

* cited by examiner

Primary Examiner—Daniel Zirker
(74) Attorney, Agent, or Firm—Ogilvy Renault; Robert Mitchell

(57) ABSTRACT

A multi-layer flexible insulation (I) comprises a series of layers which include a pair of closed-cell insulation sheets (10,12) made of multicellular plastic film (i.e. closed cell air bubbles or bubble-pack) and laminated on both sides of a thin white polyethylene film (14), a pair of aluminum foil layers or films (16,18) adhesively mounted on the outer surfaces of the bubble-pack insulation sheets (10,12), and a pair of thin clear polyester layers (20,22) provided on the outer surfaces of the aluminum layers. The aluminum layers (16,18) are vapor deposited on the polyester layers (20,22) and are assembled to the hot bubble-pack insulation sheets (10,12) while the latter are cooled. The bubble-pack sheets (10,12) are then adhered to the central polyethylene film (14) with a hot melt glue. If the polyester (20,22) is highly smooth, the aluminum (16,18) can be deposited thereon in a uniform state thereby providing a high reflectivity, low emissivity, laminate. The outer polyester coatings (20,22) also protect the aluminum layers (16,18) such as to prevent any aluminum from rubbing off the insulation (I) and also prevent the aluminum layers (16,18) from oxidizing. Furthermore, the polyester coatings (20,22) provide an hygiene barrier for the insulation (I).

19 Claims, 1 Drawing Sheet

LOW EMISSIVITY, HIGH REFLECTIVITY INSULATION

CROSS-REFERENCE

This Application is a Continuation of U.S. application Ser. No. 09/262,060 filed on Mar. 4, 1999 (to issue on Jun. 19, 2001 as U.S. Pat. No. 6,248,433), which itself is a Continuation of PCT/CA97/00625 filed on Sep. 3, 1997 designating the United States and claiming priority on U.S. application Ser. No. 08/706,288 filed on Sep. 4, 1996, abandoned.

TECHNICAL FIELD

The present invention relates to thermally insulative materials and, more particularly, to an improved sheet insulation of the reflective bubble type for use, for instance, in arenas, etc.

BACKGROUND ART

There are three modes of heat transfer: conduction, convection and radiation (infrared). Of the three, radiation is the primary mode; conduction and convection are secondary and come into play only as matter interrupts or interferes with radiant heat transfer. As the matter absorbs radiant energy, it is heated, develops a difference in temperature, and results in molecular motion (conduction in solids) or mass motion (convection in liquids and gases).

All substances, including air spaces, building materials, such as wood, glass and plaster, and insulation, obey the same laws of nature, and transfer heat. Solid materials differ only in the rate of heat transfer which is mainly affected by differences in density, weight, shape, permeability and molecular structure. Materials which transfer heat slowly can be said to resist heat flow.

Conduction is direct heat flow through matter (molecular motion). It results from actual physical contact of one part of the same body with another part, or of one body with another. For instance, if one end of an iron rod is heated, the heat travels by conduction through the metal to the other end; it also travels to the surface and is conducted to the surrounding air which is another, but less dense, body. An example of conduction through contact between two solids is a cooking pot on the solid surface of a hot stove. The greatest flow of heat possible between materials is where there is direct conduction between solids. Heat is always conducted from warm to cold; never from cold to warm and always moves via the shortest and easiest route.

In general, the more dense a substance, the better conductor it is. Solid rock, glass and aluminum, being very dense are good conductors of heat. Reduce their density by mixing air into the mass, and their conductivity is reduced. Because air has low density the percentage of heat transferred by conduction through air is comparatively small. Two thin sheets of aluminum foil with about one inch of air space in between weigh less than one ounce per square foot. The ratio is approximately 1 of mass to 100 of air, most important in reducing heat flow by conduction. The less dense the mass the less will be the flow of heat by conduction thereby resulting in a better insulative material.

Convection is the transport of heat within a gas or liquid, caused by the actual flow of the material itself (mass motion). In building spaces, natural convection heat flow is largely upward, somewhat sideways, not downwards. This is called "free convection". For instance, a warm stove, person, floor, wall, etc., loses heat by conduction to the cooler air in contact with it. This added heat activates (warms) the molecules of the air which expand, becoming less dense, and rise. Cooler, heavier air rushes in from the side and below to replace it.

Convection may also be mechanically induced, as by a fan. This is called "forced convection".

Radiation is the transmission of electromagnetic rays through space. Infrared rays occur between light and radar waves, i.e. between the 3 and 15 micron portion of the spectrum. Henceforth, when we speak of radiation, we refer only to infrared rays. Each material whose temperature is above absolute zero (−459.7° F.) emits infrared radiation, including the sun, icebergs, stoves or radiators, humans, animals, furniture, ceilings, walls, floors, etc.

All objects radiate infrared rays from their surfaces in all directions, in a straight line, until they are reflected or absorbed by another object. Traveling at the speed of light, these rays are invisible, and they have no temperature, only energy. Heating an object excites the surface molecules, causing them to give off infrared radiation. When these infrared rays strike the surface of another object, the rays are absorbed, and only then is heat produced in the object. This heat spreads throughout the mass by conduction. The heated object then transmits infrared rays from exposed surfaces by radiation, if these surfaces are exposed directly to an air space.

The amount of radiation emitted is a function of the emissivity factor of the source's surface. Emissivity is the rate at which radiation (emission) is given off. Absorption of radiation by an object is proportional to the absorptivity factor of its surface which is the reciprocal of its emissivity.

Although two objects may be identical, if the surface of one were covered with a material of 90% emissivity, and the surface of the other with a material of 5% emissivity, there would result a drastic difference in the rate of radiation flow from these two objects. The lower the emissivity, the lower the radiation. This is demonstrated by comparison of four identical, equally heated iron radiators covered with different materials. Paint one with aluminum paint and another with ordinary enamel. Cover the third with asbestos and the fourth with aluminum foil. Although all have the same temperature, the one covered with aluminum foil would radiate the least (lowest, e.g. 5%, emissivity). The radiators covered with ordinary paint or asbestos would radiate most because they have the highest emissivity (even higher than the original iron.) Painting over the aluminum paint or foil with ordinary paint changes the surface to 90% emissivity and thus increases the radiator's radiant heating capacity.

Materials whose surfaces do not appreciably reflect infrared rays, for example paper, asphalt, wood, glass and rock, have absorption and emissivity rates ranging from 80% to 93%. Most materials used in building construction (brick, stone, wood, paper, etc.) regardless of their color, absorb infrared radiation at about 90%.

The surface of aluminum has the ability not to absorb, but to reflect, 95% of the infrared rays which strike it. Since aluminum foil has such a low mass to air ratio, very little conduction can take place, particularly when only 5% of the rays are absorbed.

In order to retard heat flow by conduction, walls and roofs are built with internal air spaces. Conduction and convection through these air spaces combined represent only 20% to 35% of the heat which pass through them. In both winter and summer, 65% to 80% of the heat that passes from a warm wall to a colder wall or through a ventilated attic does so by radiation.

The value of air spaces as thermal insulation must include the character of the enclosing surfaces. The surfaces greatly affect the amount of energy transferred by radiation, depending on the material's absorptivity and emissivity, and are the only way of modifying the total heat transferred across a given space. The importance of radiation cannot be overlooked in problems involving ordinary room temperatures.

Reflection and emissivity by surfaces can only occur in space. The ideal space is any dimensioned ¾" or more. Smaller spaces are also effective, but decreasingly so. Where there is no air space, we have conduction through solids. When a reflective surface of a material is attached to a ceiling, floor or wall, that particular surface ceases to have radiant insulation value at the points in contact. Therefore, care must be exercised, when installing foil insulation, that it be stretched sufficiently to insure that any inner air spaces are properly opened up and that metal does not touch metal. Otherwise, conduction through solids will result at the point of contact.

Heat control with aluminum foil is made possible by taking advantage of its low thermal emissivity and the low thermal conductivity of air. It is possible with layered foil and air to practically eliminate heat transfer by radiation and convection.

There is no such thing as a "dead" air space as far as heat transfer is concerned, even in the case of a perfectly air-tight compartment such as a thermos bottle. Convection currents are inevitable with differences in temperature between surfaces, if air or some other gas is present inside. Since air has some density, there will be some heat transfer by conduction if any surface of a so-called "dead" air space is heated. Finally, radiation, which accounts for 50% to 80% of all heat transfer, will pass through air (or a vacuum) with ease, just as radiation travels the many million miles that separate the earth from the sun.

Aluminum foil, with its reflective surfaces can block the flow of radiation. Some foils have higher absorption and emissivity qualities than others. The variations run from 2% to 72%, a differential of 2000%.

Most aluminum insulation has only 5% absorption and emissivity ratio, is impervious to water vapor and convection currents, and reflects 95% of all radiant energy which strikes its air-bounded surfaces. The performance of most aluminum insulation is unsurpassed for upward winter heat and it has an added efficiency for downward summer heat because of the absence of convection currents. Aluminum prevents the heat rays from penetrating the surface covered therewith while reflecting the heat back, for instance, into the building.

Water vapor is the gas phase of water. As a gas, it will expand or contract to fill any space it may be in. In a given space, with the air at a given temperature, there is a limited amount of vapor that can be suspended. Any excess will turn into water. The point just before condensation commences is called 100% saturation. The condensation point is called dew point. Condensation forms whenever and wherever vapor reaches the dew point. There are vapor laws: (1) the higher the temperature, the more vapor the air can hold; the lower the temperature, the less vapor; (2) the larger the spaces, the more vapor it can hold; the smaller the space, the less vapor it can hold; (3) the more vapor in a given space, the greater will be its density; (4) vapor will flow from areas of greater vapor density to those of lower vapor density; and (5) permeability of insulation is a prerequisite for vapor transmission; the less permeable, the less vapor transfer.

In conduction, heat flows to cold. The under surface of a roof, when cold in the winter, extracts heat out of the air with which it is in immediate contact. As a result, that air drops in temperature sufficiently to fall below the dew point, i.e. the temperature at which vapor condenses on a surface. The excess amount of vapor for that temperature, that falls out as condensation or frost, attaches itself to the under side of the roof. Water vapor is able to penetrate plaster and wood readily. When the vapor comes in contact with materials within those walls having a temperature below the dew point of the vapor, they form moisture or frost within the walls. This moisture tends to accumulate over long periods of time without being noticed, which, in time, can cause building damage.

To prevent condensation, a large space is needed between outer walls and any insulation which permits vapor to flow through. Reducing the space or the temperature converts vapor to moisture which is then retained. The use of separate vapor barriers or insulation that is also a vapor barrier are alternative methods to deal with this problem. Aluminum is impervious to water vapor and with the trapped air space is immune to vapor condensation.

Regarding thermal values, the U factor represents the rate of heat flow in BTU's in one hour through a one square foot area of ceiling, roof, wall or floor, including insulation (if any) resulting from a 1° F. temperature difference between the air inside and the air outside. The R factor, or resistance to heat flow, is the reciprocal of U; in other words, 1/U. The smaller the U factor fraction, the larger the R factor, the better the insulation's ability to stop conductive heat flow. however, these neither of these factors include radiation or convection flow.

There are, at present, two kinds of techniques generally used by accepted laboratories to measure thermal values: the guarded hot plate and the hot box methods. The results obtained seem to vary between the two methods. Neither technique simulates heat flow through insulation in actual everyday usage. Thermal conductivity measurements as made in the completely dry state in the laboratory will not match the performance of a same insulation under actual field conditions. Most mass type insulating materials become better conductors of heat, and thus lose some of their insulative efficiency, when the relative humidity increases because of the absorption of moisture by the insulator. Therefore, mass insulations, which normally contain at least the average amount of moisture which is in the air, are first completely dried out before testing. In aluminum insulations, there is no such moisture problem. The R value of a mass type insulation is reduced by over 35% with only a 1½% moisture content (i.e. from R13 to R8.3). The moisture content of insulation materials in homes typically exceeds 1½%. Aluminum foil is one of the few insulating materials that is not affected by humidity and, consequently, its insulating value remains unchanged from the "bone dry" state to very high humidity conditions.

There are many different types, grades and qualities of aluminum foil insulation designed for a variety of applications. Matching the correct foil product to the specific job is extremely important to maximize final performance.

U.S. Pat. No. 4,281,802 issued on Aug. 4, 1996 to Burley discloses a membranous thermal barrier for placement on an ice surface and comprising a flexible, sheet-like covering having low moisture permeability and thermal insulation properties sufficient to substantially reduce heat transfer to the ice surface when positioned thereon during non-use hours. The thermal barrier can be of the foamed polymers in sheet form, such as closed cell foamed polymeric plastics, a layer of which is provided on one of its surface with a fabric scrim bonded thereto, and on its other surface with an aluminum film.

In Canadian Patent No. 2,067,683 issued on Mar. 1, 1994 to Energie Innovation Vaidya-Baljak Inc., there is disclosed an insulated hockey rink having walls and a ceiling interiorly lined with flexible insulation in the form of a laminate composed of an intermediate layer of air-bubble cushioning material and outer aluminum foil layers on each side thereof.

In aluminum coated insulations, the aluminum foil insulation's resistance to heat losses by radiation will be increased with a higher reflectivity of the foil, whereby it most desirable to lower the emissivity of the foil.

DISCLOSURE OF INVENTION

It is therefore an aim of the present invention to provide an improved insulation for reducing thermal losses by radiation.

It is also an aim of the present invention to provide an improved insulation of sheet-like multi-layered type.

It is a further aim of the present invention to provide an insulative laminate material having an inner layer made of closed cell air bubbles and plastic protected outer aluminum foil layers on each side of the inner layer.

It is a still further aim of the present invention to provide an insulative laminate material composed of at least one inner layer made of closed cell air bubbles and plastic protected outer aluminum foil layers thereon, wherein the aluminum foil layers are of improved reflectivity with reduced emissivity thereby further reducing radiant thermal losses.

It is a still further aim of the present invention to provide an insulative laminate material composed of at least one inner layer made of closed cell air bubbles and outer aluminum foil layers thereon which are protected by a polyester coating having improved smoothness thereby producing a product of higher optical density and thus of higher reflectivity.

Therefore, in accordance with the present invention, there is provided a high reflectivity insulative material comprising an outer polyester sheet, an insulation layer, and an aluminum film between an inner surface of said polyester sheet and an outer surface of said insulation layer, wherein said polyester sheet has a melt point of at least approximately 400° F. thereby resulting in high smoothness such that said aluminum film is substantially uniformly coated thereon, whereby said insulative material has a high reflectivity even with said polyester sheet facing outwardly thereof.

Also in accordance with the present invention, there is provided a high reflectivity insulative material comprising an outer polyester sheet, an insulation layer, an aluminum film between an inner surface of said polyester sheet and an outer surface of said insulation layer, and a plastic sheet on an inner surface of said insulation layer.

Further in accordance with the present invention, there is provided a method for producing a high reflectivity insulative material, comprising the steps of:

providing and heating a polyester film having a melt point of at least approximately 400° F.;

depositing a coating of aluminum on the heated polyester film;

providing a thermally insulative layer on said aluminum coating opposite said polyester film; and providing a reflective plastic sheet on said insulative layer opposite said aluminum coating.

BRIEF DESCRIPTION OF THE DRAWINGS

Having thus generally described the nature of the invention, reference will now be made to the accompanying drawings, showing by way of illustration a preferred embodiment thereof, and in which.

MODES FOR CARRYING OUT THE INVENTION

Figure 1:
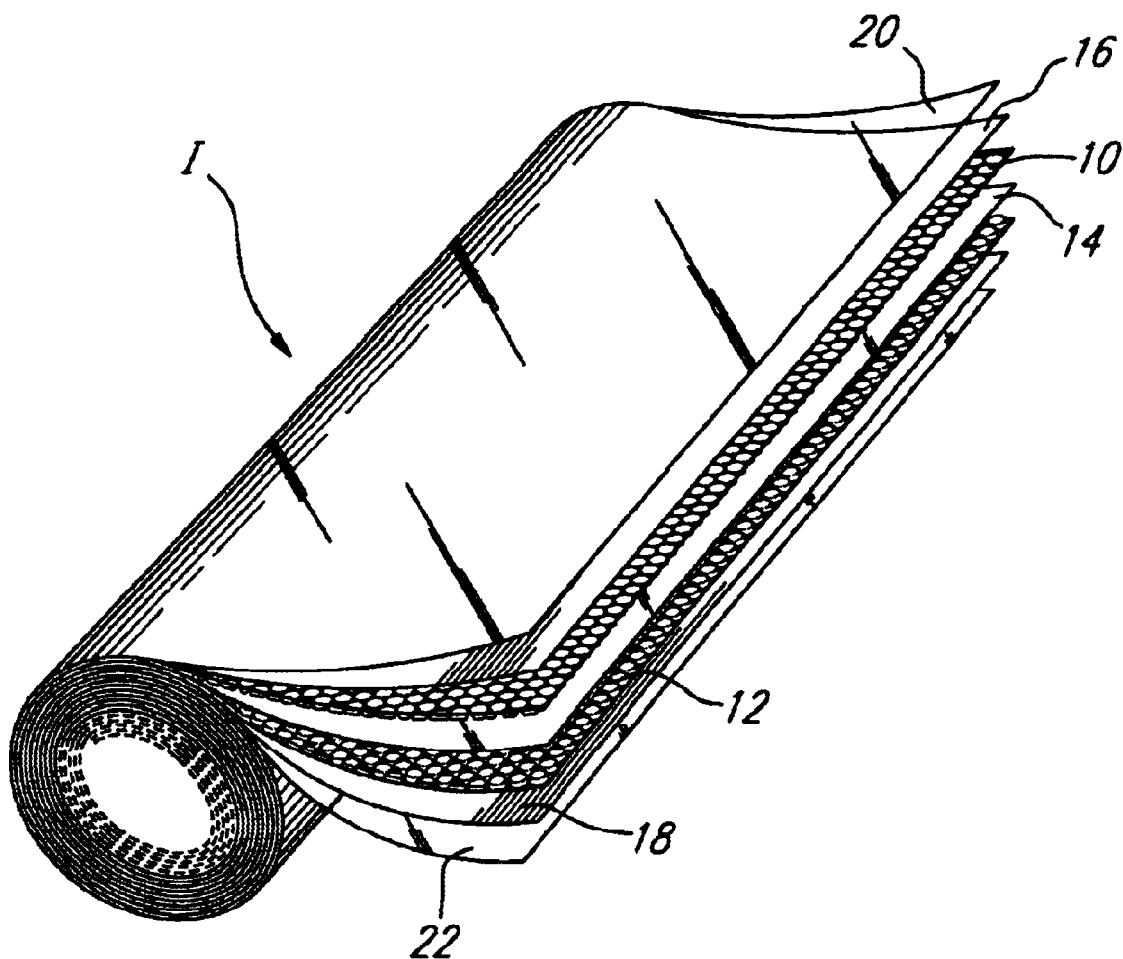
FIG. 1 is a schematic view of an improved insulation in accordance with the present invention, wherein the various layers thereof are shown in part in a separated relation for illustration purposes.

In accordance with the present invention, FIG. 1 illustrates a roll of flexible insulation I comprising a series of layers which include first and second layers 10 and 12 made of multicellular plastic film (i.e. closed cell air bubbles or bubble-pack) and laminated on both sides of a white 1 mil thick polyethylene film 14; a pair of aluminum foil layers 16 and 18 laminated on the outer surfaces of the bubble-pack layers 10 and 12, and 1 mil thick clear polyester layers 20 and 22 coated on the outer surfaces of the aluminum layers 16 and 18, respectively. The aluminum layers 16 and 18 are vapor deposited on the polyester layers 22 and 24 and are assembled to the bubble-pack layers 10 and 12 which are, in turn, adhered to the central polyethylene film 14. The outer polyester coatings 20 and 22 protect the aluminum layers 16 and 18 such as to prevent any aluminum from rubbing off the insulation I and also prevent the aluminum layers 16 and 18 from oxidizing. Furthermore, the polyester coatings 20 and 22 provide an hygiene barrier for the insulation I.

The insulation I of the present invention is very efficient, affordable, flexible and washable. It can be installed by way of glue, tacks, staples, nails, bolts, tapes, Velcro™, etc. The insulation I can be used to insulate garage doors, barns, well-head wraps, ice fishing huts, motor homes, cottages, arenas, cold rooms, etc.; it can be used under cement, as duct wrap, coasters, can coolers, place mats, boot insoles, in survival blankets, to wrap food for shipping, etc.

It is again noted that the emissivity is a measurement of the radiation emitted by a surface. The lower the value of a product on the emissivity scale, the better the insulation and greater will be the energy cost reduction.

The "ultimate" insulation will possess the ability to reflect a high degree of heat or cold energy. It will insulate against any remaining passage of heat or cold, and will have excellent white light reflectance. Also, it will be noncorrosive.

Without the outside polyester layers, a shiny aluminum layer will have a high, and thus desirable for an insulation, reflectivity of perhaps 97%. However, the aluminum will quickly oxidize and its reflectivity will drop off quickly to about 75%.

However, with the polyester coatings, 20 and 22 embodied in the insulation I of the present invention, there is no oxidization of the aluminum coatings or layers 16 and 18. However, the polyester coating constitutes partly a barrier which reduces the reflectivity of the non-coated aluminum below its 97%+/−1% mark. It is therefore desirable to try to increase as much as possible the reflectivity of the laminated assembly made up of the polyester and aluminum layers. The polyester coating 20/22 also renders the insulation I non-conductive to electricity.

The present I of the present invention has extremely high performance in all three above-noted areas, i.e. high reflectivity, low emissivity and high white light reflectance. Indeed, the present insulation I has an emissivity value of around 0.14+/−0.02 and a reflectivity of around 90 to 95% with a ⅝" sheet of insulation I typically having an insulative value of 12R; the insulation I has a very high white light reflectance of around 85%; and it forms a perfect vapor barrier, whereby the installation of a layer of another product is not required with the presence of the present insulation I.

This high reflectivity, even with the outside polyester layer 20,22, can be achieved in the present insulation I and results from an increase in the smoothness of the polyester layers 20 and 22.

Indeed, using for instance a 48 gauge polyester sheet, type FPO$^3$ made by Colon, which is a polyester film of greater smoothness, a higher reflectivity of the outer surfaces of the insulation I is achieved as, with its smoothness, the polyester film 20,22 can be heated to a higher temperature thereby allowing for a more uniform coating of aluminum (i.e. the aluminum layers 16 and 18) to be applied thereon, whereby a thicker aluminum layer can be deposited. Indeed, the surface of the polyester film being very smooth and flat allows the aluminum to be vapor deposited at a higher density or finer grain density thereby resulting in a lower emissivity and in higher reflective values. The polyester film's smoothness and high melt temperature produces a layer 20,22 of high optical density of approximately 3.30 (and between 3.10 and 3.50; tests have even showed an average optical density of 3.5 up to a present maximum of 4.0) at 75° F. and a laminate composed of the polyester film 20,22 and of the aluminum layer or coating 16,18 having a reflectivity possibly as high as 95%.

The Colon FPO$^3$ polyester sheet has a high melt point of around 400° F. and a tensile modulus of 600,000 psi. The aluminum can be deposited on the polyester sheet with a thickness of approximately 250° A.

The glue used to adhere the polyethylene layer 14 to the bubble-pack layers 10 and 12 can be, for instance, Swift's 2H436 pressure sensitive hot melt adhesive which is typically applied at temperatures of 250–325° F., having a melt point of 214° F., and which has a viscosity of 650 cps at 300° F. The melted glue is sprayed on the bubble-pack layers 10 and 12 which are then adhered to the polyethylene central layer 14, the high melt point of the glue providing a flame retardant barrier for the insulation I which meets the standards. It is noted that the bubble-pack layers 10 and 12 when manufactured come out at around 700° F. at which point the aluminum/polyester laminates 16/20 and 18/22 are applied thereon with a cooling being effected by way of chilling rollers to prevent the aluminum/polyester laminates 16/20 and 18/22 from melting. Thereafter, the two bubble-pack/aluminum/polyester laminates 10/16/20 and 12/18/22 are mounted to the polyethylene layer 14 with the hot melt glue, as described hereinabove.

I claim:

1. A high reflectivity insulative material comprising an outer polyester sheet, an insulation layer, and an aluminum film between an inner surface of said polyester sheet and an outer surface of said insulation layer, wherein said polyester sheet has a melt point of at least approximately 400° F. thereby resulting in high smoothness such that said aluminum film is substantially uniformly coated thereon, whereby said insulative material has a high reflectivity even with said polyester sheet facing outwardly thereof.

2. An insulative material as defined in claim 1, wherein said polyester sheet has an optical density of at least 3.10 at 75° F.

3. An insulative material as defined in claim 1, wherein said polyester sheet, said insulation layer and said aluminum film form a laminate, a pair of said laminates being assembled symmetrically on each side of a plastic sheet.

4. An insulative material as defined in claim 1, wherein said polyester sheet has a 48 gauge thickness.

5. An insulative material as defined in claim 1, wherein said insulation layer comprises a closed-cell type insulation.

6. An insulative material as defined in claim 3, wherein said plastic sheet has a reflective color.

7. An insulative material as defined in claim 6, wherein said plastic sheet is made of polyethylene.

8. An insulative material as defined in claim 7, wherein said plastic sheet is made of white polyethylene.

9. A high reflectivity insulative material comprising an outer polyester sheet, an insulation layer, an aluminum film between an inner surface of said polyester sheet and an outer surface of said insulation layer, and a plastic sheet on an inner surface of said insulation layer.

10. An insulative material as defined in claim 9, wherein said plastic sheet has a reflective color.

11. An insulative material as defined in claim 10, wherein said plastic sheet is made of polyethylene.

12. An insulative material as defined in claim 11, wherein said plastic sheet is made of white polyethylene.

13. An insulative material as defined in claim 12, wherein said polyester sheet, said insulation layer and said aluminum film form a laminate, a pair of said laminates being assembled symmetrically on each side of said plastic sheet.

14. An insulative material as defined in claim 9, wherein said insulation layer comprises a closed-cell type insulation.

15. A method for producing a high reflectivity insulative material, comprising the steps of:

a) providing and heating a polyester film having a melt point of at least approximately 400° F.;

b) depositing a coating of aluminum on the heated polyester film;

c) providing a thermally insulative layer on said aluminum coating opposite said polyester film; and d) providing a reflective plastic sheet on said insulative layer opposite said aluminum coating.

16. A method as defined in claim 15, wherein in step (b), said aluminum is vapor deposited on said polyester film.

17. A method as defined in claim 15, wherein said plastic sheet has a reflective color.

18. A method as defined in claim 17, wherein said plastic sheet is made of polyethylene.

19. A method as defined in claim 18, wherein said plastic sheet is made of white polyethylene.

* * * * *